(12) United States Patent
Kim

(10) Patent No.: US 11,230,178 B2
(45) Date of Patent: Jan. 25, 2022

(54) ENGINE MOUNT

(71) Applicants: Hyundai Motor Company, Seoul (KR); Kia Motors Corporation, Seoul (KR)

(72) Inventor: Seung-Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/995,090

(22) Filed: Aug. 17, 2020

(65) Prior Publication Data
US 2021/0316603 A1    Oct. 14, 2021

(30) Foreign Application Priority Data
Apr. 8, 2020  (KR) .......................... 10-2020-0042855

(51) Int. Cl.
*B60K 5/12*    (2006.01)
(52) U.S. Cl.
CPC ................................ *B60K 5/1283* (2013.01)
(58) Field of Classification Search
CPC .... F16F 9/066; F16F 9/14; B60K 5/12; B60K 5/1275; B60K 5/1283; B60K 5/1291
USPC .................................................. 267/120, 140
See application file for complete search history.

(56) References Cited

U.S. PATENT DOCUMENTS

| 4,693,455 | A | * | 9/1987  | Andra    | F16F 13/264 188/379  |
| 4,711,206 | A | * | 12/1987 | Andra    | F16F 13/22 248/636   |
| 4,896,867 | A | * | 1/1990  | Schyboll | F16F 13/107 138/30   |
| 5,102,105 | A | * | 4/1992  | Hamaekers| F16F 13/18 180/902   |
| 5,215,293 | A | * | 6/1993  | Muramatsu| F16F 13/10 267/122   |
| 5,443,574 | A | * | 8/1995  | Ohtake   | F16F 13/262 267/140.14 |
| 5,501,433 | A | * | 3/1996  | Satori   | F16F 13/106 248/636  |

(Continued)

FOREIGN PATENT DOCUMENTS

| CN | 208845627 U    | 5/2019 |
| KR | 10-2013-0003749 A | 1/2013 |

(Continued)

*Primary Examiner* — Jeffrey J Restifo
(74) *Attorney, Agent, or Firm* — Mintz Levin Cohn Ferris Glovsky and Popeo, P.C.; Peter F. Coriess

(57) ABSTRACT

An engine mount is provided to change properties based on magnitudes of amplitudes input to the engine mount. The engine mount includes a membrane having a central portion and an outer circumferential portion. Upper and lower orifice brackets are mounted between an insulator and a diaphragm to divide an interior of a main casing into an upper liquid chamber and a lower liquid chamber. The upper and lower orifice brackets define a flow path that enables a fluid to flow between the upper and lower liquid chambers and define a receiving space in which the membrane is movable in a vertical direction. An air chamber is connected to a lower side of the lower orifice bracket and allows a lower portion of the membrane to be exposed to air.

9 Claims, 14 Drawing Sheets

(56) References Cited

U.S. PATENT DOCUMENTS

| | | | | |
|---|---|---|---|---|
| 5,927,699 A * | 7/1999 | Nakajima | F16F 13/14 | |
| | | | 267/140.14 | |
| 6,443,438 B2 * | 9/2002 | Satori | F16F 13/105 | |
| | | | 267/140.13 | |
| 6,454,249 B1 * | 9/2002 | Childers | F16F 13/262 | |
| | | | 267/140.14 | |
| 6,543,756 B2 * | 4/2003 | Ihara | F16F 13/103 | |
| | | | 180/291 | |
| 6,619,636 B2 * | 9/2003 | Yamamoto | F16F 13/101 | |
| | | | 267/140.13 | |
| 7,040,607 B2 * | 5/2006 | Grassmuck | F16F 13/106 | |
| | | | 267/140.13 | |
| 7,334,783 B2 * | 2/2008 | Yoneyama | F16F 13/105 | |
| | | | 267/140.13 | |
| 7,802,777 B2 * | 9/2010 | Katayama | F16F 13/107 | |
| | | | 267/140.13 | |
| 8,356,806 B2 * | 1/2013 | Garety | F16F 13/108 | |
| | | | 267/140.13 | |
| 8,594,911 B2 * | 11/2013 | Okamoto | F16F 13/264 | |
| | | | 701/111 | |
| 8,657,269 B2 * | 2/2014 | Nishi | F16F 13/101 | |
| | | | 267/140.12 | |
| 8,714,530 B2 * | 5/2014 | Kanaya | F16F 13/106 | |
| | | | 267/140.13 | |
| 8,783,668 B2 * | 7/2014 | Ishikawa | F16F 13/106 | |
| | | | 267/140.13 | |
| 8,960,631 B2 * | 2/2015 | Kato | F16F 13/102 | |
| | | | 248/560 | |
| 8,998,186 B2 * | 4/2015 | Kim | F16F 13/105 | |
| | | | 267/140.13 | |
| 9,033,319 B2 * | 5/2015 | Kim | F16F 13/105 | |
| | | | 267/140.14 | |
| 9,574,636 B2 * | 2/2017 | Kim | F16F 13/10 | |
| 9,605,727 B2 * | 3/2017 | Kim | F16F 13/26 | |
| 9,676,264 B2 * | 6/2017 | Kim | B60K 5/1208 | |
| 9,713,954 B2 * | 7/2017 | Kim | F16F 13/002 | |
| 9,987,915 B1 * | 6/2018 | Yoon | B60K 5/1283 | |
| 10,029,553 B2 * | 7/2018 | Jo | F16F 9/3207 | |
| 10,077,820 B2 * | 9/2018 | Kim | F16F 13/26 | |
| 10,180,173 B2 * | 1/2019 | Kim | F16F 13/10 | |
| 10,215,253 B2 * | 2/2019 | Kim | F16F 13/106 | |
| 10,293,672 B2 * | 5/2019 | Kim | F16F 13/14 | |
| 10,295,010 B2 * | 5/2019 | N | F16F 13/22 | |
| 10,336,175 B2 * | 7/2019 | Yoon | B60K 5/1208 | |
| 10,352,395 B2 * | 7/2019 | Yasuda | F16F 13/26 | |
| 10,406,904 B2 * | 9/2019 | Kim | F16F 13/105 | |
| 10,406,906 B2 * | 9/2019 | Yoon | B60K 5/1208 | |
| 10,427,514 B2 * | 10/2019 | Kim | B60K 5/1283 | |
| 10,436,281 B2 * | 10/2019 | Kim | B60K 5/1208 | |
| 10,508,707 B2 * | 12/2019 | Vollmann | F16F 13/106 | |
| 10,520,057 B2 * | 12/2019 | Kim | B60K 5/1208 | |
| 10,538,154 B2 * | 1/2020 | Kim | B60K 5/1208 | |
| 10,549,621 B2 * | 2/2020 | Yun | F16F 13/10 | |
| 10,618,397 B2 * | 4/2020 | Kim | B60K 5/1283 | |
| 10,619,697 B2 * | 4/2020 | Han | F16F 13/103 | |
| 10,744,864 B2 * | 8/2020 | Choi | B60K 5/1208 | |
| 10,753,422 B2 * | 8/2020 | Raida | B60K 5/1283 | |
| 10,773,584 B2 * | 9/2020 | Kim | F16F 13/18 | |
| 10,899,216 B2 * | 1/2021 | Kim | H02K 35/02 | |

FOREIGN PATENT DOCUMENTS

| | | |
|---|---|---|
| KR | 10-1288995 B1 | 7/2013 |
| KR | 10-1676257 B1 | 11/2016 |

* cited by examiner

ENGINE MOUNT

CROSS-REFERENCE TO RELATED APPLICATIONS

This application claims priority under 35 U.S.C. § 119 to Korean Patent Application No. 10-2020-0042855, filed on Apr. 8, 2020, the disclosure of which is incorporated herein by reference in its entirety.

BACKGROUND

1. Field of the Disclosure

The present disclosure relates to an engine mount, and more particularly, to an engine mount having self-switchable properties with dynamic characteristics and attenuation characteristics that change based on a traveling condition even without a separate driver.

2. Description of the Related Art

As technologies applied to vehicles have been gradually developed and consumer demands for low vibration and low noise have been increased, efforts to analyze noise, vibration, and harshness in the vehicles and maximize noise, vibration, and harshness performances are continuing. Engine vibration, which is generated in a specific revolutions per minute (RPM) region while the vehicle is being driven, is transmitted, at a specific frequency, to an interior of the vehicle via a vehicle body. In particular, an effect of an explosive component of the engine on the interior of the vehicle is substantial.

In general, vibration is always structurally generated in the engine of the vehicle due to a periodic change in center position caused by vertical movements of a piston and a connecting rod, a periodic change in inertial force applied to reciprocating parts in an axial direction of the cylinder, a periodic change in inertial force caused by the connecting rod swaying to the left and the right based on a crank shaft, and a periodic change in rotational force applied to the crank shaft. Therefore, an engine mount is mounted between the engine and the vehicle body of the vehicle and attenuates noise and vibration transmitted from the engine while supporting the engine. The engine mounts are broadly classified into a rubber engine mount, an air damping mount, and a fluid-encapsulated engine mount.

Among the engine mounts, the fluid-encapsulated engine mount has a structure in which damping force is generated as a fluid encapsulated below an insulator (main rubber) flows between an upper liquid chamber and a lower liquid chamber. The fluid-encapsulated engine mount has an advantage of being able to attenuate both high-frequency vibration (small-displacement vibration) and low-frequency vibration (large-displacement vibration) depending on different scenarios.

Recently, to improve vibration isolation characteristics of the fluid-encapsulated engine mounts, active engine mounts, semi-active mounts, and the like have been developed. The active engine mount improves ride quality and traveling performances of the vehicle by reducing vibration, which is transmitted to the vehicle body, by generating control force having a frequency identical to a frequency of a vibration component that most significantly degrades noise, vibration and harshness (NVH) performances, among the vibration components applied to the engine mount, based on a driving state of the vehicle, a state of the engine, an acceleration signal, and the like.

Various types of semi-active mounts are disclosed in the prior art. In general, the semi-active mount installed between the engine (or a power train) and the vehicle body effectively reduces vibration occurring due to the operation of the engine by controlling and turning on/off dynamic characteristics of the mount.

The semi-active mount is provided with an inner flow path configured to connect upper and lower liquid chambers, and an air chamber connected to an atmospheric air supply passageway and configured to act as a characteristic changing device. The semi-active mounts widely used include a bypass type mount which additionally has a second flow path for communicating with the upper liquid chamber and the lower liquid chamber and intermittently opens and closes the second flow path, and a volume-stiffness type mount which uses a solenoid valve to adjust behavior of a membrane that vibrates in accordance with a flow of a hydraulic liquid.

The bypass type mount and the volume-stiffness type mount differ from each other in terms of the implementation method or the tendency of dynamic characteristics. The bypass type mount exhibits lower dynamic characteristics than the volume-stiffness type mount in a low-frequency region, and the bypass type mount exhibits higher dynamic characteristics than the volume-stiffness type mount in a high-frequency region. However, since the semi-active mount has a structure in which a driver (including a rod, a spring, a coil, a power applying device, and the like) is additionally mounted on the fluid-encapsulated engine mount, the consumption of electric current is increased as the driver is additionally mounted, which may adversely affect fuel economy and cause an increase in production cost and weight.

SUMMARY

The present disclosure provides an engine mount capable of reducing production costs and a weight thereof by applying a volume-stiffness type semi-active mount that controls behavior of a membrane that vibrates in accordance with a flow of a fluid to change properties in accordance with magnitudes of amplitudes inputted to the engine mount, and to eliminate a driver used for a semi-active mount in the related art.

In order to achieve the aforementioned object, the present disclosure provides an engine mount that may include: a membrane having a central portion and an outer circumferential portion; upper and lower orifice brackets mounted between an insulator and a diaphragm to divide an interior of a main casing into an upper liquid chamber and a lower liquid chamber, the upper and lower orifice brackets defining a flow path that enables a fluid to flow between the upper and lower liquid chambers, and defining a receiving space in which the membrane is movable in a vertical direction; and an air chamber connected to a lower side of the lower orifice bracket and allowing a lower portion of the membrane to be exposed to air.

In particular, the membrane may freely vibrate when a magnitude of a first input amplitude is generated, and the fluid may move through the flow path when the membrane moves in the vertical direction and stops when a magnitude of a second input amplitude, which is greater than the magnitude of the first input amplitude, is generated. According to the present disclosure, the following effects are achieved.

First, it may be possible to reduce production costs and a weight by eliminating a driver in comparison with an electronic (e.g., bypass type or a volume-stiffness type) semi-active mount in the related art.

Second, in comparison with a bypass type self-switchable mount, it may be possible to improve dynamic characteristics and NVH performances even in a case in which a magnitude of a small-displacement input amplitude is generated in a high-frequency region.

Third, the amount of rubber of the central portion of the membrane may be increased thus increasing sensitivity to the magnitude of the input amplitude.

Fourth, a shape of a peripheral portion of the central portion of the membrane is inclined to stably block a fixing aperture and an air aperture, such that durability is ensured as the aperture are blocked.

Fifth, it is possible to adjust a gap between the membrane and the air aperture in accordance with the magnitudes of the input amplitudes as the adjustment unit having the air aperture moves.

Sixth, because the adjustment unit may be easily moved, it is easy to adjust the gap without a need to newly manufacture a mount in order to adjust the gap between the membrane and the air aperture.

Seventh, the dynamic characteristics may be tuned by differently applying a diameter of the second air aperture of the adjustment unit for each type of vehicle.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of an engine mount according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term to describe his/her own disclosure by the best method.

The engine mount according to the present disclosure has a self-switchable engine mount structure in which a driver and wiring are removed from an electronic semi-active engine mount and properties thereof vary based on an input amplitude. The variable property type may be applied to a volume-stiffness type engine mount is advantageous in high frequency dynamic characteristics.

Figure 1:
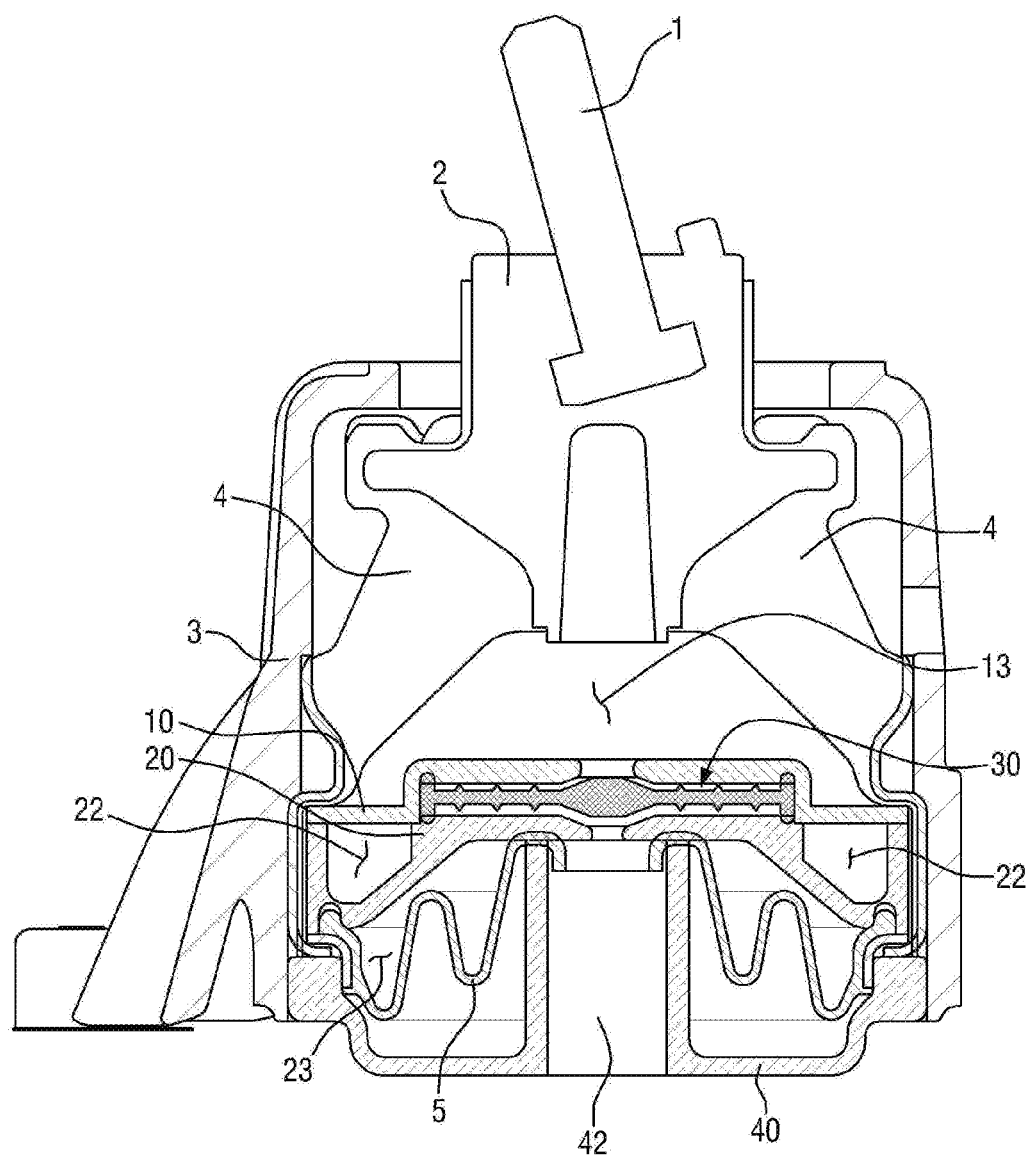
FIG. 1 is a view illustrating a cross section of an engine mount according to an exemplary embodiment of the present disclosure.
Figure 2:
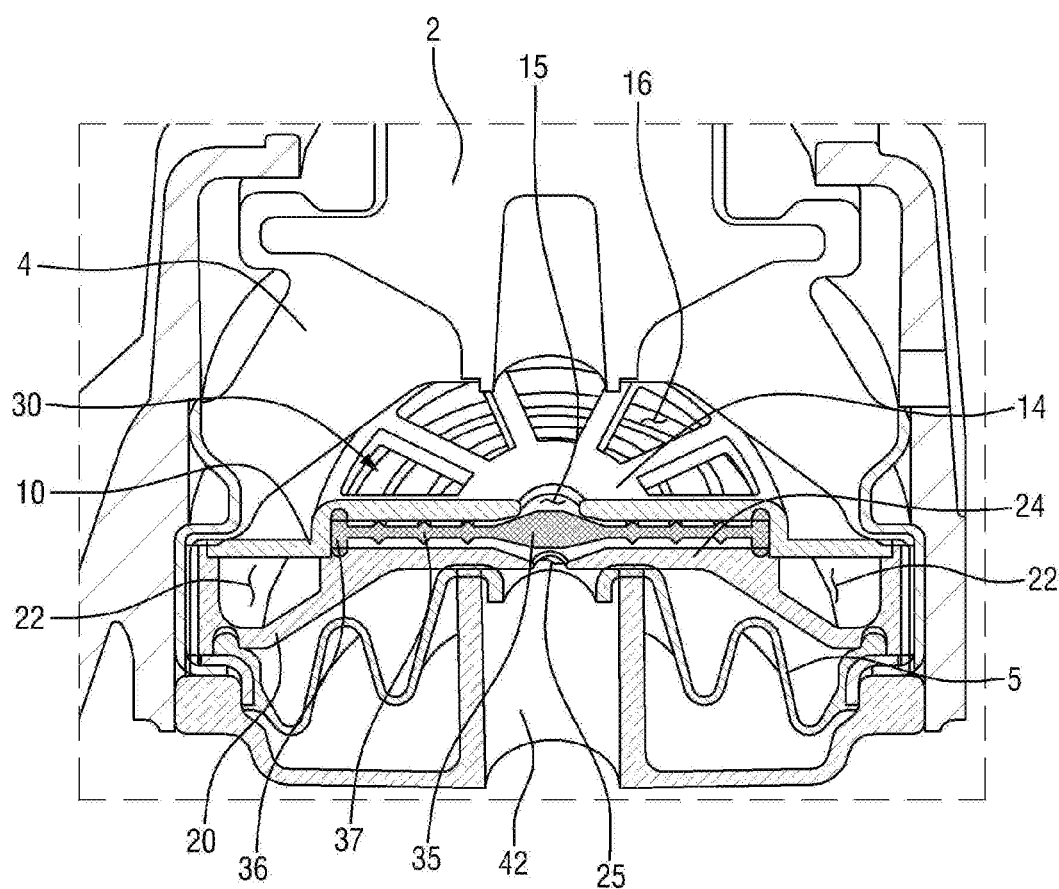
FIG. 2 is a view illustrating a state in which the engine mount illustrated in FIG. 1 is inclined so that an upper surface of an upper orifice bracket is shown according to an exemplary embodiment of the present disclosure.
Figure 3:
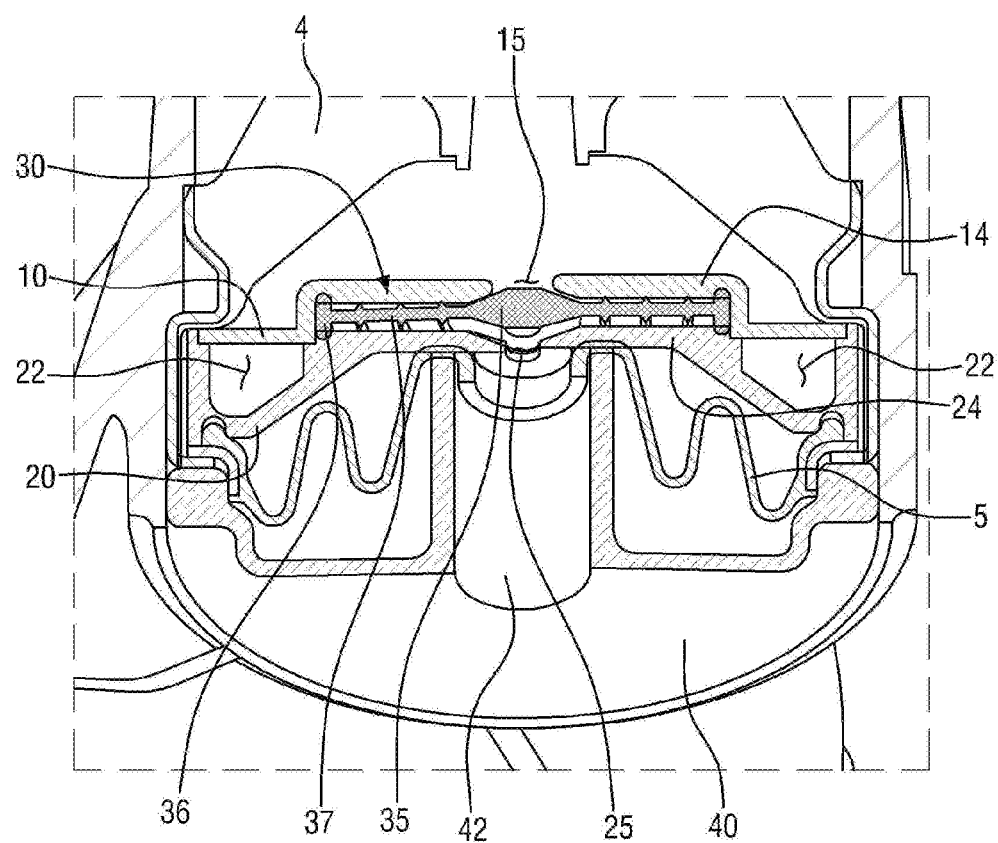
FIG. 3 is a view illustrating a state in which the engine mount illustrated in FIG. 1 is inclined so that a lower surface of a lower orifice bracket is shown according to an exemplary embodiment of the present disclosure.

FIG. 1 is a view illustrating a cross section of an engine mount according to an exemplary embodiment of the present disclosure, FIG. 2 is a view illustrating a state in which the engine mount illustrated in FIG. 1 is inclined so that an upper surface of an upper orifice bracket is shown, and FIG. 3 is a view illustrating a state in which the engine mount illustrated in FIG. 1 is inclined so that a lower surface of a lower orifice bracket is shown.

Referring to FIGS. 1 to 3, a structure of the engine mount according to the exemplary embodiment of the present disclosure will be described. A main rubber 4 made of an elastic material and coupled to a core 2 may be mounted at an upper side in a main casing 3, and a diaphragm 5 may be coupled at a lower side of the main casing 3. Upper and lower orifice brackets 10 and 20 may be positioned between the main rubber 4 and the diaphragm 5 and divide an upper liquid chamber 13 and a lower liquid chamber 23. A cup 40 having an air chamber 42 may be coupled at a lower side of the main casing 3.

The upper orifice bracket 10, together with the main rubber 4, defines the upper liquid chamber 13. The upper orifice bracket 10 may include a part which defines an annular flow path 22 together with the lower orifice bracket 20 and has an aperture (not illustrated) that allows the upper liquid chamber 13 to communicate with the flow path 22. The upper orifice bracket 10 may also include a part which defines a receiving space configured to receive a membrane 30.

A first receiving plate 14 may be formed at an upper side of the receiving space, a fixing aperture 15 may be formed at a center of the first receiving plate 14, and fluid apertures 16 may be formed at the periphery of the center of the first receiving plate 14 and enable a fluid encapsulated in the upper liquid chamber 13 to flow in and out. A lower peripheral portion of the fixing aperture 15 may be inclined and have a posture spread downward.

The lower orifice bracket 20, together with the diaphragm 5, defines the lower liquid chamber 23. The lower orifice bracket 20 may include a part which defines the annular flow path 22 together with the upper orifice bracket 10 and has an aperture that communicates with the lower liquid chamber 23. The lower orifice bracket 20 may also include a part which defines the receiving space. A second receiving plate 24 may be formed at a lower side of the receiving space, and a first air aperture 25 may be formed at a center of the second receiving plate 24 and enables air to flow in and out through the air chamber 42. An upper peripheral portion of the first air aperture 25 may be inclined and have a posture (e.g., shape) spread upward. The membrane 30 may be positioned in the receiving space and may be moved by vibration transmitted through a bolt 1 and the core 2. The membrane 30 may include a central portion 35, an outer circumferential portion 36, and a connecting portion 37.

The central portion 35 may be thicker than other portions of the membrane 30. An upper side of the central portion 35 may be inserted into the fixing aperture 15, and a lower side of the central portion 35 may be inserted into the first air aperture 25. Further, an upper peripheral portion of the central portion 35 may be inclined to correspond to the lower peripheral portion of the fixing aperture 15, and a lower peripheral portion of the central portion 35 may be inclined to correspond to the upper peripheral portion of the first air aperture 25. A first end of the outer circumferential portion 36 may be fixed to the first receiving plate 14, and a second end of the outer circumferential portion 36 may be fixed to the second receiving plate 24. The connecting portion 37 is a portion that connects the central portion 35 and the outer circumferential portion 36 and has a plate shape, and may guide routes for the fluid or air are formed on both surfaces of the connecting portion 37.

When no external force is applied to the membrane 30, the upper side of the central portion 35 and the fixing aperture 15 may be spaced apart from each other at a predetermined distance, and the lower side of the central portion 35 and the first air aperture 25 may be spaced apart from each other at a predetermined distance. The connecting portion 37 may be positioned to be spaced apart from the first receiving plate 14 and the second receiving plate 24 at a predetermined distance. Therefore, the central portion 35 and the connecting portion 37 may be bent while moving in a vertical direction in the receiving space, and the movements of the central portion 35 and the connecting portion 37 may be restricted when the central portion 35 and the connecting portion 37 come into contact with the first receiving plate 14 and the second receiving plate 24. In contrast, the outer circumferential portion 36 is blocked from moving since the outer circumferential portion 36 is fixed in the receiving space.

As described above, the annular flow path 22 may be formed by the upper orifice bracket 10 and the lower orifice bracket 20. The fluid may flow between the upper liquid chamber 13 and the lower liquid chamber 23 through the flow path 22 formed in this manner. In the exemplary embodiment of the present disclosure, a first end of the diaphragm 5 may be connected to the lower orifice bracket 20, and a second end of the diaphragm 5 may be bent and inserted into the air chamber 42 thus exposing the first air aperture 25. Of course, there is no limitation to the method of connecting the diaphragm 5 to the lower orifice bracket 20. The air chamber 42 provides a movement route for air to expose the membrane 30, specifically, the lower side of the central portion 35 to the air. The air chamber 42 may be formed integrally with the cup 40 and then assembled to the main casing 3.

Figure 4:
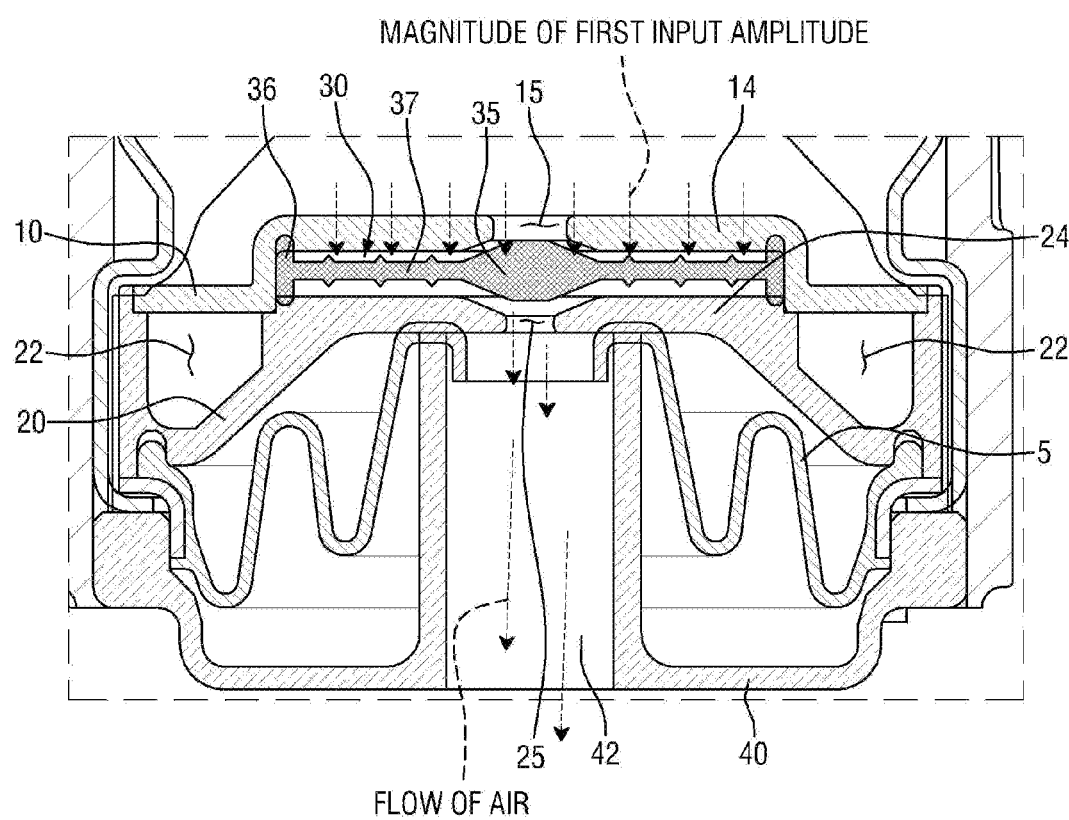
FIG. 4 is a view illustrating a damping route when a magnitude of a first input amplitude is made in the engine mount according to the exemplary embodiment of the present disclosure.
Figure 5A:
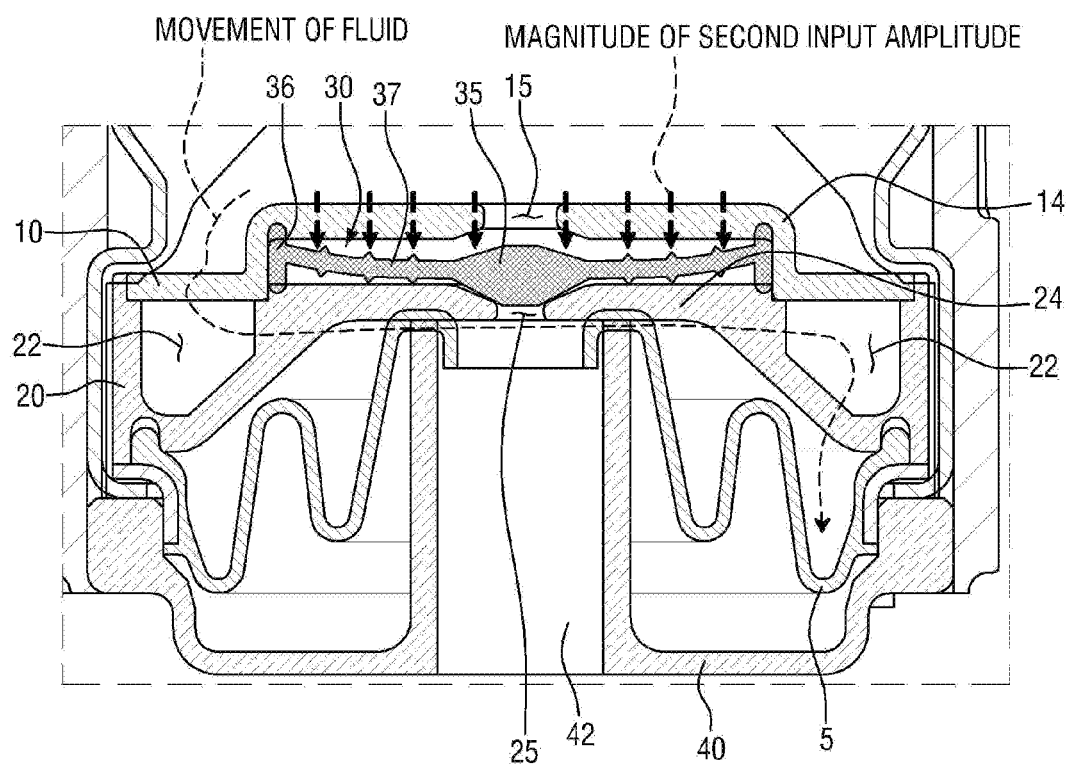
FIGS. 5A and 5B are views illustrating a damping route when a magnitude of a second input amplitude is made in the engine mount according to the exemplary embodiment of the present disclosure.
Figure 5B:
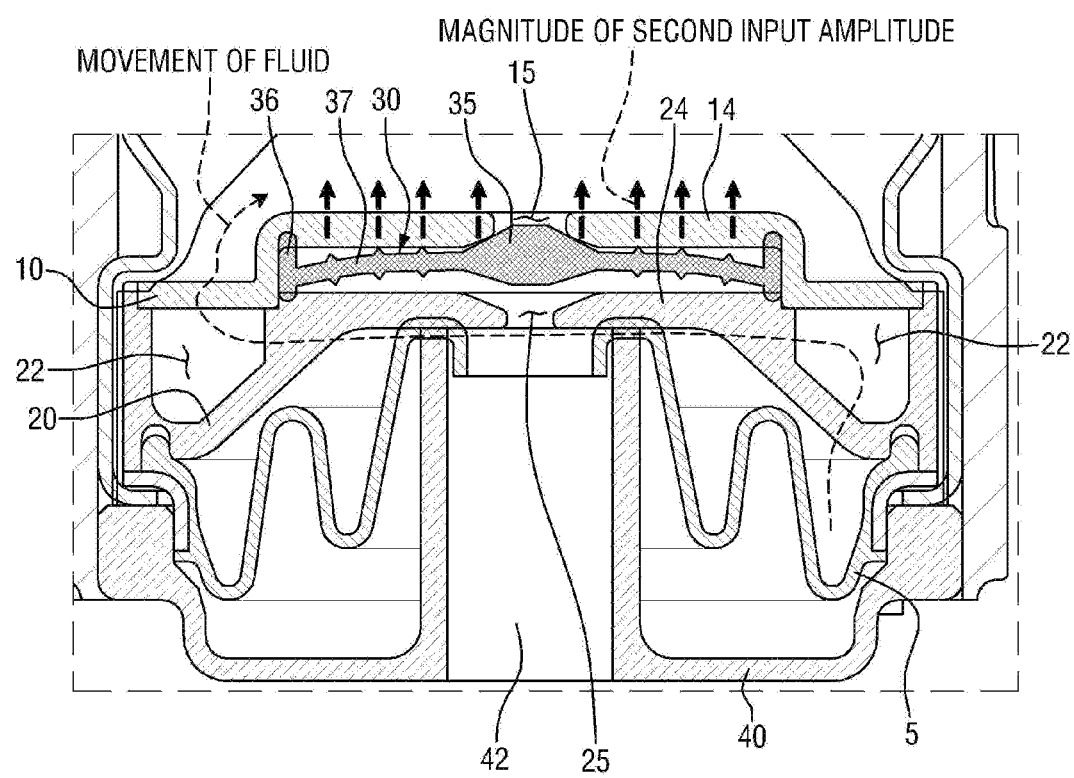

FIG. 4 is a view illustrating a damping route when a magnitude of a first input amplitude is generated in the engine mount according to the exemplary embodiment of the present disclosure, and FIGS. 5A and 5B are views illustrating a damping route when a magnitude of a second input amplitude is generated in the engine mount according to the exemplary embodiment of the present disclosure.

Hereinafter, changes in damping characteristics based on the magnitudes of the input amplitude will be described with reference to FIGS. 4, 5A, and 5B. In the present specification, based on the magnitudes of the input amplitudes, a small magnitude of the input amplitude is referred to as the magnitude of the first input amplitude, and a magnitude of the input amplitude, which is greater than the magnitude of the first input amplitude, is referred to as the magnitude of the second input amplitude. In particular, a displacement of the membrane 30 when the magnitude of the first input amplitude is generated is a high-frequency small displacement, for example, a frequency of 20 to 40 Hz and an amplitude of −0.2 to +0.2 mm, and a displacement of the membrane 30 when the magnitude of the second input amplitude is generated is a low-frequency large displacement, for example, a frequency of 8 to 12 Hz and an amplitude of −1 to +1 mm.

Referring to FIG. 4, when the vibration having the magnitude of the first input amplitude is transmitted to the engine mount, the fluid encapsulated in the upper liquid chamber 23 moves (e.g., vibrates) the membrane 30 through the fluid apertures 16 by the vibration. In particular, since the magnitude of the first input amplitude is small, the central portion 35 of the membrane 30 does not come into contact with the fixing aperture 15 or the first air aperture 25 even though the central portion 35 of the membrane 30 moves in the vertical direction. The lower portion of the central portion 35 may be exposed to the air through the air chamber 42, and the air flows in the air chamber 42 by the vibration caused by the moving central portion 35 (e.g., dynamic characteristics are reduced). As a result, a vibration damping effect is generated as the membrane 30 freely vibrates when the magnitude of the first input amplitude is made.

Referring to FIGS. 5A and 5B, when the vibration having the magnitude of the second input amplitude is transmitted to the engine mount, the fluid encapsulated in the upper liquid chamber 13 moves (e.g., vibrates) the membrane 30 through the fluid apertures 16 by the vibration. In particular, since the magnitude of the second input amplitude is greater than the magnitude of the first input amplitude, there is no gap between the central portion 35 and the fixing aperture 15 and between the central portion 35 and the first air aperture 25 as the membrane 30 moves in the vertical direction.

Referring to FIG. 5A, the central portion 35 blocks the first air aperture 25 when the central portion 35 moves downward when the magnitude of the second input amplitude is generated. Particularly, since the air chamber 42 is blocked by the central portion 35, there is no flow of air. Therefore, the vibration damping effect is generated as the fluid encapsulated in the upper liquid chamber 13 moves along the flow path 22 through the aperture formed in the upper orifice bracket 10 and then moves to the lower liquid chamber 23.

Referring to FIG. 5B, the central portion 35 is caught and stopped by the fixing aperture 15 when the central portion 35 moves upward when the magnitude of the second input amplitude is generated. Therefore, the vibration damping effect is generated as the fluid encapsulated in the lower liquid chamber 23 moves along the flow path 22 through the aperture formed in the lower orifice bracket 20 and then moves to the upper liquid chamber 13.

Meanwhile, the magnitudes of the first and second input amplitudes are predetermined values. The magnitude of the input amplitude, which is less than a value when there is no gap between the central portion 35 and the fixing aperture 15 or between the central portion 35 and the first air aperture 25, may be set to the magnitude of the first input amplitude. The magnitude of the input amplitude, which is greater than the value, may be set to the magnitude of the second input amplitude.

As described above, the central portion 35 is thick in the exemplary embodiment of the present disclosure. Therefore, a weight of the central portion 35 is increased, and sensitivity may be improved based on the magnitude of the input amplitude. In addition, the upper and lower peripheral portions of the central portion 35 may be inclined and come into contact with the peripheral portion of the fixing aperture 15 and the peripheral portion of the first air aperture 25, respectively, and as a result, durability is ensured when the central portion 35 blocks the fixing aperture 15 or the first air aperture 25 as the membrane 30 moves.

Figure 6A:
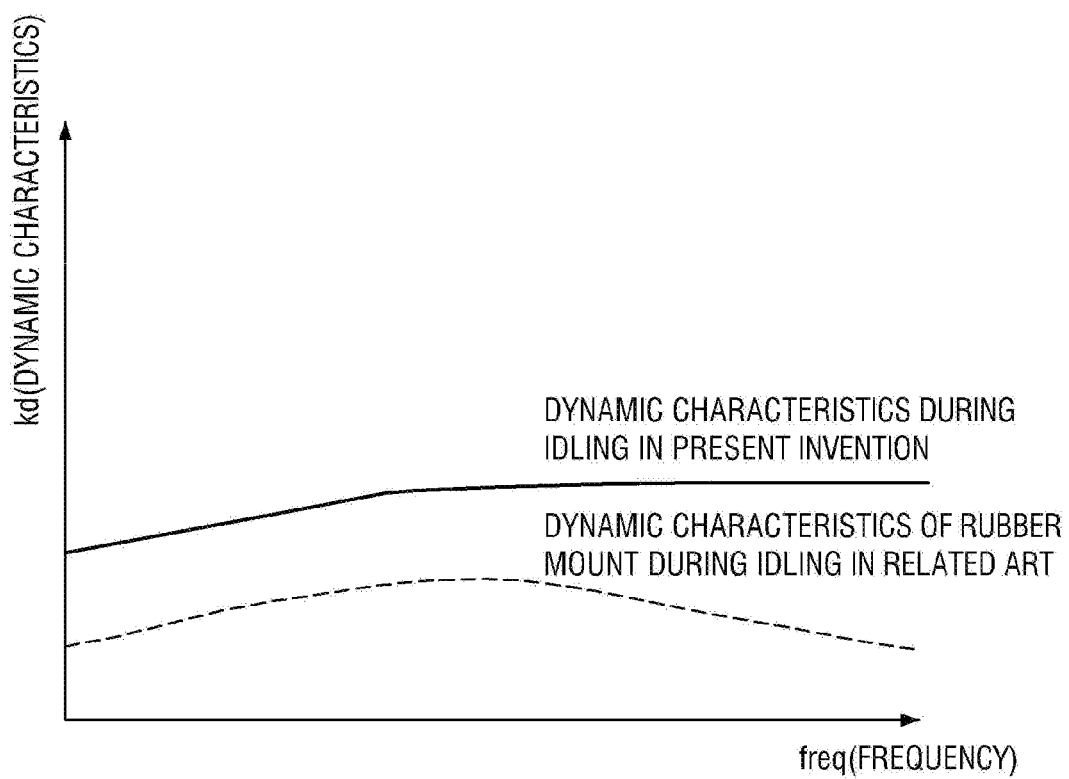
FIG. 6A is a view illustrating dynamic characteristics of the engine mount according to the exemplary embodiment of the present disclosure when the magnitude of the first input amplitude is made.
Figure 6B:
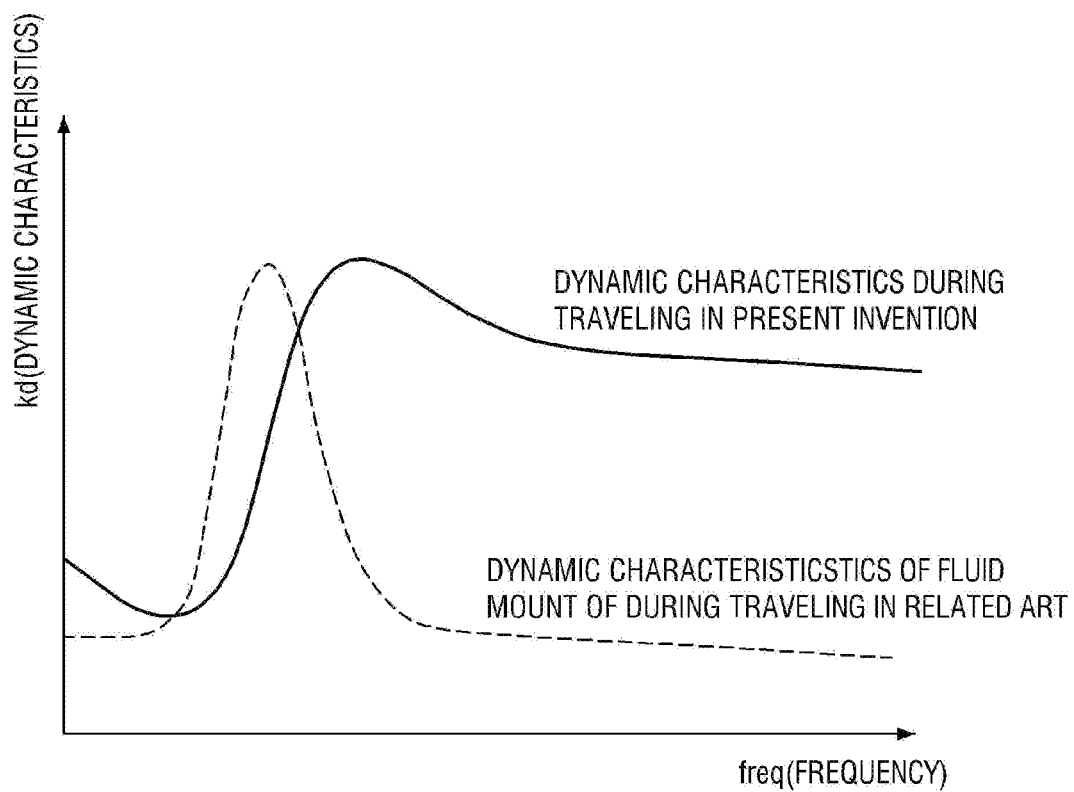
FIG. 6B is a view illustrating dynamic characteristics of the engine mount according to the exemplary embodiment of the present disclosure when the magnitude of the second input amplitude is made.

FIG. 6A is a view illustrating dynamic characteristics of the engine mount according to the exemplary embodiment of the present disclosure when the magnitude of the first input amplitude is generated. FIG. 6B is a view illustrating dynamic characteristics of the engine mount according to the exemplary embodiment of the present disclosure when the magnitude of the second input amplitude is generated.

As described above, the engine mount according to the exemplary embodiment of the present disclosure has self-switching properties that change dynamic characteristics and attenuation characteristics while switching between a rubber mount system and a fluid mount system in accordance with the magnitudes of the input amplitudes. When the vibration having the magnitude of the first input amplitude is transmitted, the engine mount operates as the rubber mount system.

Typically, the engine mount made of a rubber material exhibits excellent absorption and attenuation performances against vibration components having a high-frequency small amplitude among the vibration components generated when the engine operates. In this case, as illustrated in FIG. 6A, the dynamic characteristics are reduced even in a high-frequency section in which the amplitude is small, and as a result, there is an effect of improving the noise, vibration, and harshness (NVH) performance. This state of the engine mount is suitable for the vibration damping effect generated during idling.

When the vibration having the magnitude of the second input amplitude is transmitted, the engine mount operates as the fluid mount system. In this case, as illustrated in FIG. 6B, the engine mount according to the exemplary embodiment of the present disclosure has a value of dynamic characteristics equal to or less than that of a general fluid mounting system in a frequency section. This state of the engine mount is suitable for the vibration damping effect generated during traveling.

Figure 7:
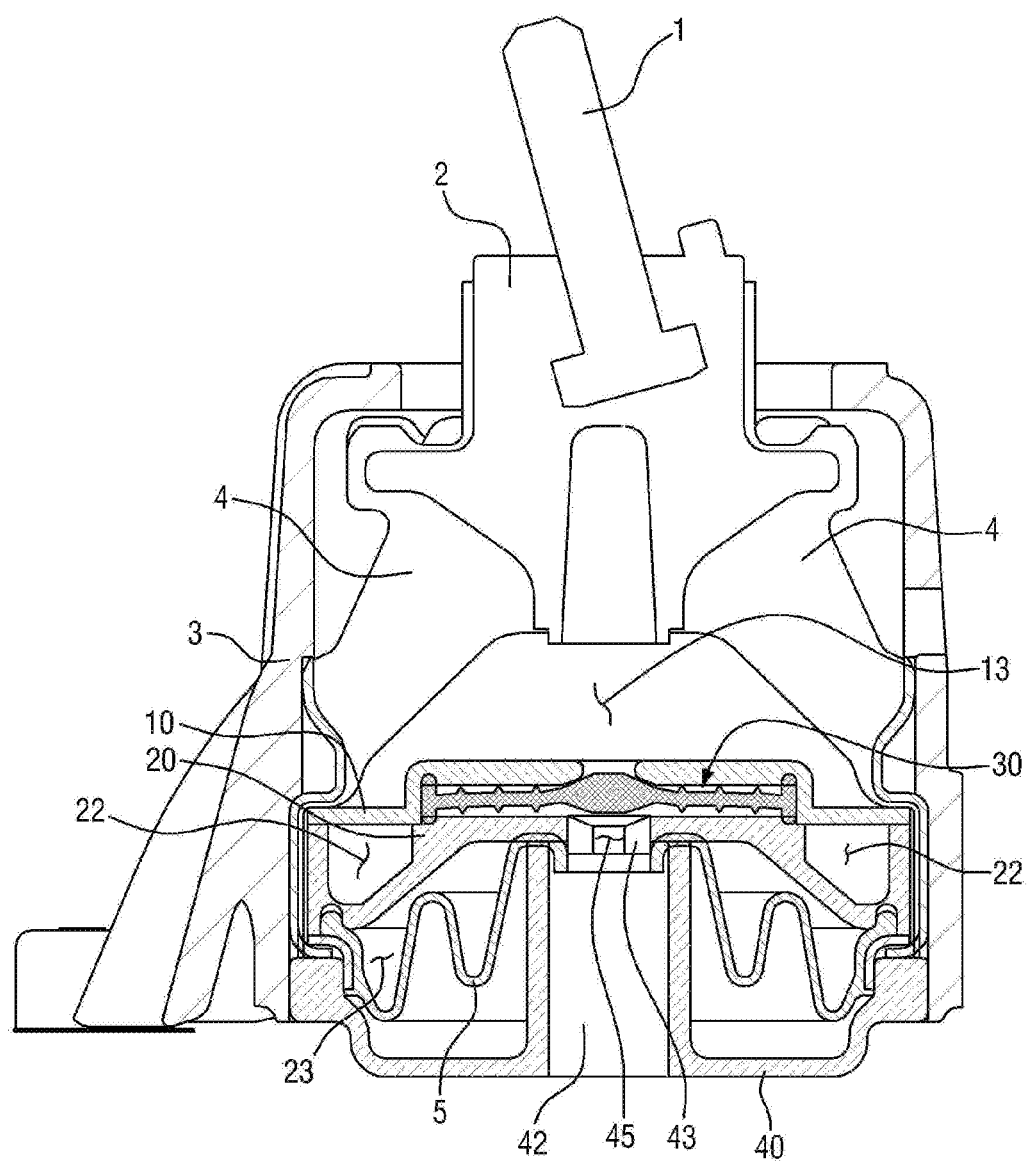
FIG. 7 is a view illustrating a cross section of the engine mount according to another exemplary embodiment of the present disclosure.
Figure 8A:
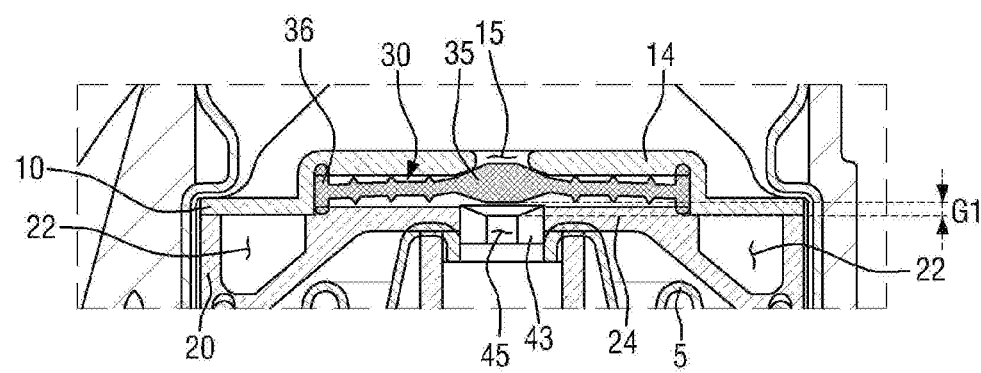
FIGS. 8A to 8C are views illustrating states in which a size of a gap varies depending on a movement state of an adjustment unit in FIG. 7 according to an exemplary embodiment of the present disclosure.
Figure 8B:
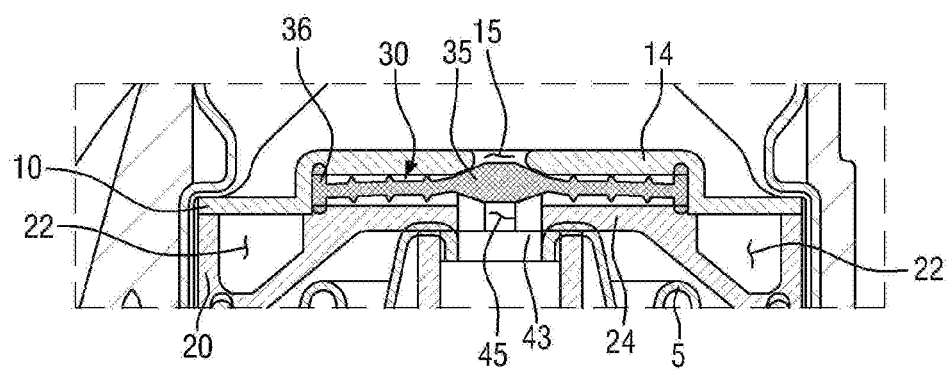
Figure 8C:
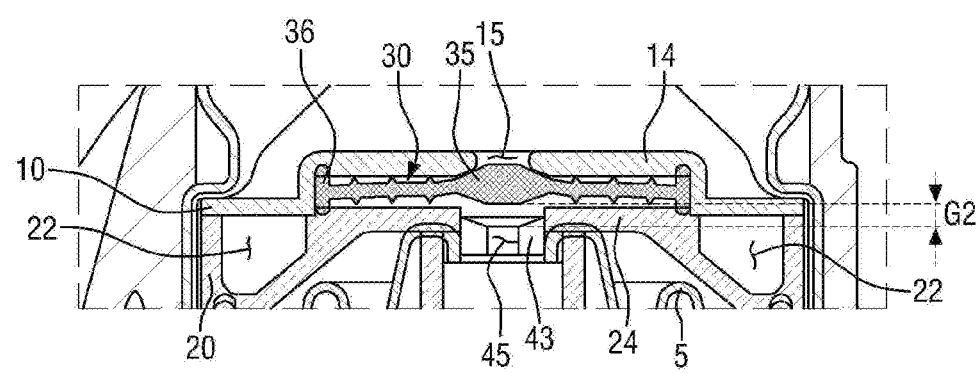
Figure 9:
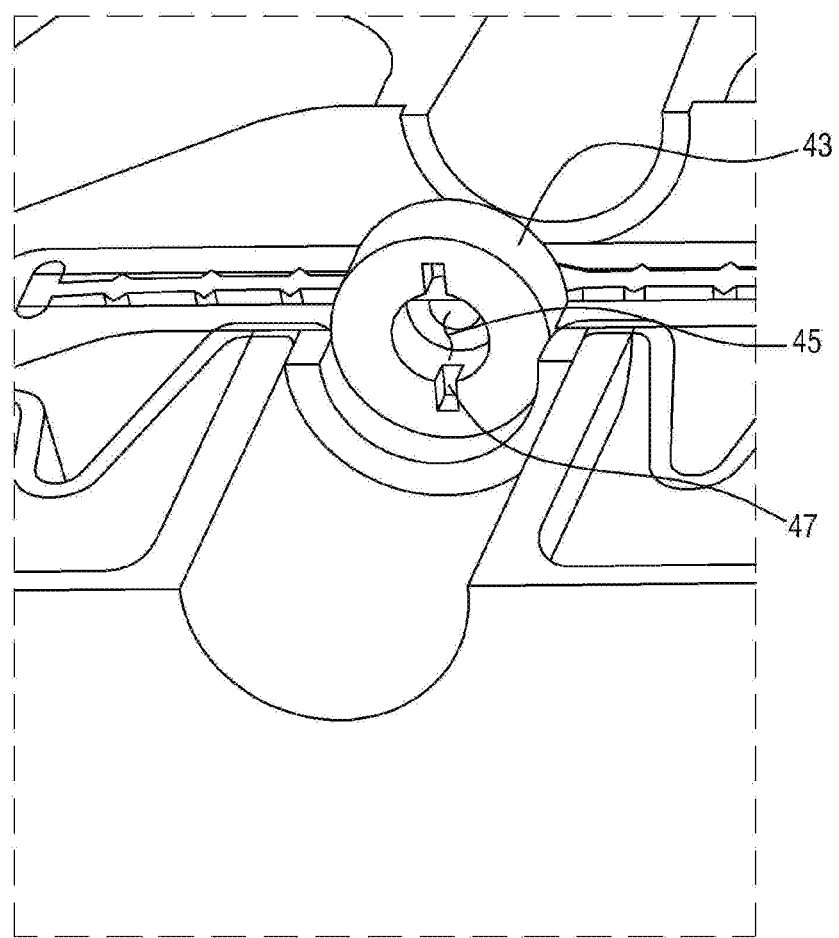
FIG. 9 is a view illustrating a state in which the engine mount illustrated in FIG. 7 is inclined so that a lower surface of the adjustment unit is shown according to an exemplary embodiment of the present disclosure.

FIG. 7 is a view illustrating a cross section of the engine mount according to another exemplary embodiment of the present disclosure, FIGS. 8A to 8C are views illustrating states in which a size of a gap varies based on a movement state of an adjustment unit in FIG. 7, and FIG. 9 is a view illustrating a state in which the engine mount illustrated in FIG. 7 is inclined so that a lower surface of the adjustment unit is shown.

Meanwhile, according to another exemplary embodiment of the present disclosure, an adjustment unit 43 may be further provided in the lower orifice bracket 20. The adjustment unit 43 may be further applied to adjust upward and downward (e.g., vertical) movement distances of the central portion 35 to tune, for each type of vehicle, the dynamic characteristics of the membrane 30 for absorbing micro-displacement vibration and the dynamic characteristics of the membrane 30 for absorbing large-displacement vibration.

Meanwhile, the configuration required in another exemplary embodiment of the present disclosure, except for the adjustment unit 43, is the same as the configuration according to the exemplary embodiment of the present disclosure, and a second air aperture 45 of the adjustment unit 43 performs the same function as the first air aperture 25.

Referring to FIG. 7, the adjustment unit 43 may be formed in the second receiving plate 24 and positioned below the central portion 35. The adjustment unit 43 may be moved in the vertical direction in the second receiving plate 24. There is no limitation to the method of moving the adjustment unit 43, but the adjustment unit 43 according to another exemplary embodiment of the present disclosure is described as moving by a screw. The second air aperture 45 may be formed at a center of the adjustment unit 43 and enables the air to flow in and out through the air chamber 42. An upper peripheral portion of the second air aperture 45 may be inclined and has a posture or shape spread or extending upward.

Referring to FIG. 8A, at a moved position of the current adjustment unit 43, there is a distance, a gap of G1 between the lower side of the central portion 35 and the second air aperture 45. Referring to FIG. 8B, when the adjustment unit 43 moves upward, the distance between the lower side of the central portion 35 and the second air aperture 45 decreases. On the contrary, referring to FIG. 8C, when the adjustment unit 43 moves downward, the distance between the lower side of the central portion 35 and the second air aperture 45 increases. As illustrated in FIG. 8C, a distance between the lower side of the central portion 35 and the second air aperture 45 is a gap of G2 greater than the gap of G1.

Meanwhile, as described above, the adjustment unit 43 according to another exemplary embodiment of the present disclosure may be moved by the screw. As illustrated in FIG. 9, a screwdriver insertion groove 47 may be formed in the adjustment unit 43, and an operator may insert a screwdriver through the air chamber 42 and change the position of the adjustment unit 43. However, it may be sufficiently understood by those skilled in the art that the adjustment unit 43 may be moved in various known ways.

Figure 10A:
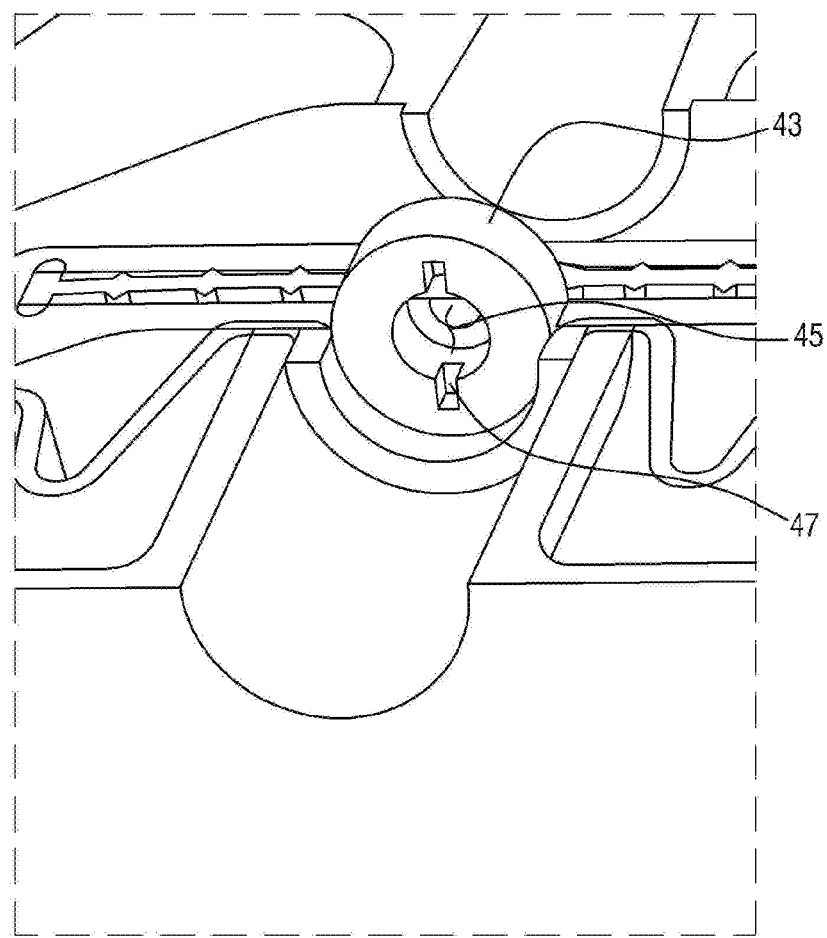
FIGS. 10A and 10B are views illustrating states in which the engine mount according to another exemplary embodiment of the present disclosure is tuned so that second air apertures formed in the adjustment units have different diameters, respectively.
Figure 10B:
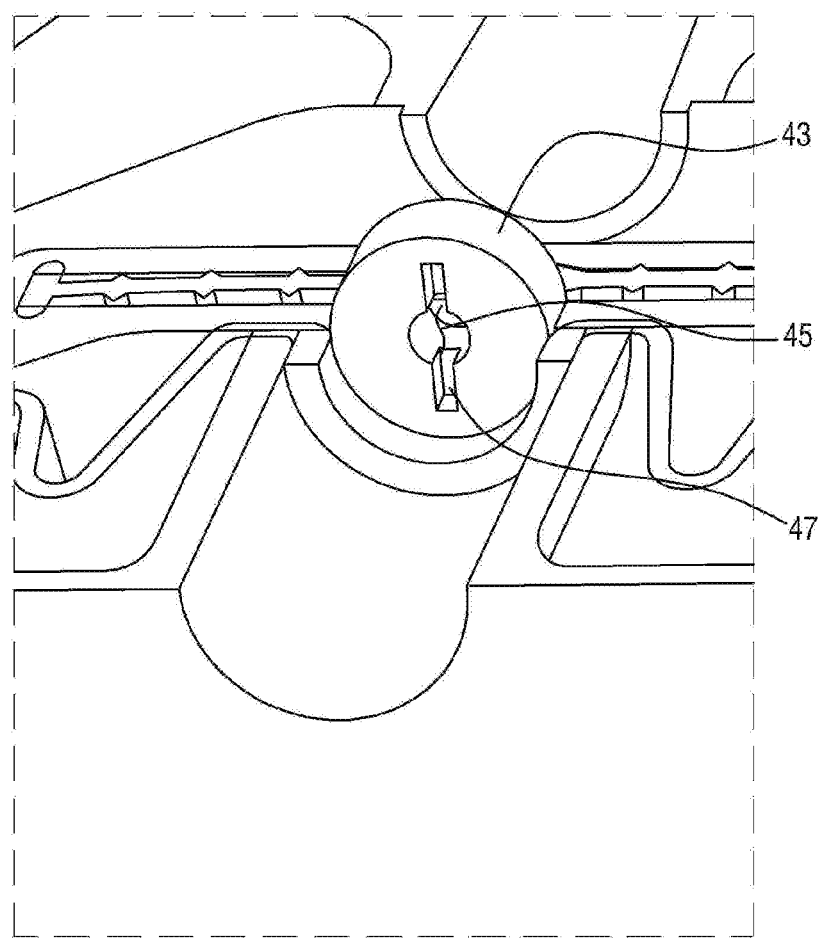

FIGS. 10A and 10B are views illustrating states in which the engine mount according to another exemplary embodiment of the present disclosure is tuned so that second air apertures formed in the adjustment units have different diameters, respectively.

Referring to FIGS. 10A and 10B, the dynamic characteristics may be tuned by differently applying, for each type of vehicle, the diameter of the second air aperture 45 of the adjustment unit 43. For example, when it is necessary to reduce the dynamic characteristics (e.g., improve idling vibration due to an increase in insulation properties) when the engine mount according to the exemplary embodiment of the present disclosure operates as the rubber system, the diameter of the second air aperture 45 may be tuned to be large. When it is necessary to increase damping (e.g., improve traveling vibration) when the engine mount operates as the fluid system, the diameter of the second air aperture 45 may be tuned to be small. The tuning of the diameter of the second air aperture 45 indicates that the magnitude of the damping (loss factor) and the dynamic characteristics, which are opposite to each other, may be adjusted by adjusting rigidity of a lower volume of the membrane 30.

The present disclosure has been described with reference to the limited exemplary embodiments and the drawings, but the present disclosure is not limited thereto. The described exemplary embodiments may be variously changed or modified by those skilled in the art to which the present disclosure pertains within the technical spirit of the present disclosure and within the scope equivalent to the appended claims.

What is claimed is:

1. An engine mount, comprising:
   a membrane including a central portion and an outer circumferential portion;
   upper and lower orifice brackets mounted between an insulator and a diaphragm to divide an interior of a main casing into an upper liquid chamber and a lower liquid chamber, the upper and lower orifice brackets defining a flow path that enables a fluid to flow between the upper and lower liquid chambers, and defining a receiving space in which the membrane is movable in a vertical direction; and
   an air chamber connected to a lower side of the lower orifice bracket and allowing a lower portion of the membrane to be exposed to air,
   wherein the upper orifice bracket has a fixing aperture into which the central portion of the membrane is inserted,
   wherein the membrane freely vibrates when a magnitude of a first input amplitude is generated, and
   wherein the fluid moves through the flow path when the membrane moves in the vertical direction and stops when a magnitude of a second input amplitude, which is greater than the magnitude of the first input amplitude, is generated.

2. The engine mount of claim 1, wherein in the receiving space, upward and downward movements of the outer circumferential portion of the membrane are restricted, and the central portion of the membrane is movable in the vertical direction.

3. The engine mount of claim 1, wherein the central portion of the membrane is thicker than other portions of the membrane.

4. The engine mount of claim 3, wherein a lower peripheral portion of the fixing aperture is inclined, and the central portion of the membrane, which comes into contact with the lower peripheral portion of the fixing aperture, is formed to be inclined.

5. The engine mount of claim 1, wherein the lower orifice bracket includes a first air aperture that communicates with the air chamber, and the central portion of the membrane is inserted into the air aperture.

6. The engine mount of claim 5, wherein the central portion of the membrane is thicker than other portions of the membrane.

7. The engine mount of claim 6, wherein an upper peripheral portion of the first air aperture is inclined, and the central portion of the membrane, which comes into contact with the upper peripheral portion of the first air aperture, is formed to be inclined.

8. The engine mount of claim 1, wherein an adjustment unit having a second air aperture formed in a space communicating with the air chamber is formed in the lower orifice bracket to be movable in the vertical direction.

9. The engine mount of claim 8, wherein a diameter of the second air aperture is tunable.

* * * * *